(12) United States Patent
Wang (10) Patent No.: US 11,072,240 B2
(45) Date of Patent: Jul. 27, 2021

(54) TOUCH-SENSITIVE VEHICLE CONSOLE ASSEMBLIES

(71) Applicant: Daimay North America Automotive, Inc., Redford, MI (US)

(72) Inventor: Jianhua Wang, Novi, MI (US)

(73) Assignee: Daimay North America Automotive, Inc., Redford, MI (US)

(*) Notice: Subject to any disclaimer, the term of this patent is extended or adjusted under 35 U.S.C. 154(b) by 127 days.

(21) Appl. No.: 16/444,288

(22) Filed: Jun. 18, 2019

(65) Prior Publication Data
US 2019/0389308 A1 Dec. 26, 2019

Related U.S. Application Data

(60) Provisional application No. 62/687,391, filed on Jun. 20, 2018.

(51) Int. Cl.
| | |
|---|---|
| *B60K 37/06* | (2006.01) |
| *B60Q 3/64* | (2017.01) |
| *B60K 35/00* | (2006.01) |
| *B60Q 3/74* | (2017.01) |

(52) U.S. Cl.
CPC .............. *B60K 37/06* (2013.01); *B60K 35/00* (2013.01); *B60Q 3/64* (2017.02); *B60Q 3/74* (2017.02); *B60K 2370/1434* (2019.05); *B60K 2370/771* (2019.05)

(58) Field of Classification Search
CPC .... B60K 2370/1434; B60K 2370/1438; B60Q 3/62; B60Q 3/64; B60Q 3/66
See application file for complete search history.

(56) References Cited

U.S. PATENT DOCUMENTS

| | | | | |
|---|---|---|---|---|
| 6,819,990 | B2* | 11/2004 | Ichinose | ................ B60K 35/00 701/36 |
| 8,049,722 | B2* | 11/2011 | Kumon | .................. B60K 37/06 345/158 |
| 2019/0025984 | A1* | 1/2019 | Weilbacher | ........... G06F 3/0421 |

* cited by examiner

*Primary Examiner* — Robert J May
(74) *Attorney, Agent, or Firm* — Carlson, Gaskey & Olds, P.C.

(57) ABSTRACT

A console assembly for a vehicle according to an exemplary aspect of the present disclosure includes, among other things, a touch-sensitive panel providing at least one touch-sensitive switch, and a circuit electrically connected to the at least one switch. The circuit is configured to receive one or more inputs from the touch-sensitive panel and issue commands to control one or more aspects of the vehicle.

18 Claims, 9 Drawing Sheets

FIG.11

TOUCH-SENSITIVE VEHICLE CONSOLE ASSEMBLIES

RELATED APPLICATIONS

This application claims the benefit of U.S. Provisional Application No. 62/687,391 filed on Jun. 20, 2018, the entirety of which is herein incorporated by reference.

TECHNICAL FIELD

This disclosure relates to console assemblies, and more particularly to console assemblies having touch-sensitive user interfaces and used within passenger motor vehicles.

BACKGROUND

Some passenger motor vehicles include consoles, including overhead consoles which are attached to the roof of the vehicle. Overhead consoles may be centrally located between the driver side and passenger side seats. Such consoles can be equipped with various displays, controls, and convenience features accessible to the occupants of the vehicle.

SUMMARY

A console assembly for a vehicle according to an exemplary aspect of the present disclosure includes, among other things, a touch-sensitive panel providing at least one touch-sensitive switch, and a circuit electrically connected to the at least one switch. The circuit is configured to receive one or more inputs from the touch-sensitive panel and issue commands to control one or more aspects of the vehicle.

In a further embodiment, the circuit is integral with the panel.

In a further embodiment, the circuit includes a flexible circuit board.

In a further embodiment, the console assembly is an overhead console assembly.

In a further embodiment, the assembly includes a light guide arranged at an outer periphery of the panel, and a housing that receives the panel.

In a further embodiment, the assembly includes a light guide arranged at an outer periphery of the panel, and a lamp.

In a further embodiment, the assembly includes a selector configured to adjust a color of light emitted from one or both of the light guide and lamp.

In a further embodiment, the lamp is a first lamp and wherein the console assembly further comprises a second lamp.

In a further embodiment, the circuit is configured to command the first lamp, second lamp, and light guide to illuminate to indicate a door ajar condition.

In a further embodiment, the assembly includes a light source adjacent an end of the light guide and configured to direct light along the light guide.

In a further embodiment, the light source is an LED.

In a further embodiment, the at least one touch-sensitive switch includes a plurality of touch-sensitive switches, each of the touch-sensitive switches corresponding to a respective aspect of the vehicle, and the control configured interpret inputs from each of the touch-sensitive switches and issue commands to the respective aspect of the vehicle.

In a further embodiment, the plurality of touch-sensitive switches are arranged adjacent a plurality of indicators.

In a further embodiment, each of the plurality of touch-sensitive switches are configured to selectively control one of a sunroof, sunshade, rear lift gate, Wi-Fi, Bluetooth, window, window lock, door lock, camera inputs, on/off, trunk, and an HVAC system, and each of the plurality of indicators are configured to selectively illuminate to indicate one of an airbag condition, seatbelt condition, child sensor condition, air quality condition, and a light sensor condition.

In a further embodiment, each of the plurality of touch-sensitive switches are rearward of each of the plurality of indicators.

A vehicle according to an exemplary aspect of the present disclosure includes, among other things, an interior roof, an overhead console assembly located adjacent the interior roof. The console assembly includes a touch-sensitive panel providing at least one touch-sensitive switch, and a circuit electrically connected to the at least one switch. The circuit is configured to receive one or more inputs from the touch-sensitive panel and issue commands to control one or more aspects of the vehicle.

In a further embodiment, the circuit is integral with the panel.

In a further embodiment, the circuit includes a flexible circuit board.

In a further embodiment, the assembly includes a light guide arranged at an outer periphery of the panel, a light source adjacent an end of the light guide and configured to direct light along the light guide, a lamp, and a selector configured to adjust a color of light emitted from one or both of the light guide and lamp.

In a further embodiment, the at least one touch-sensitive switch includes a plurality of touch-sensitive switches, each of the touch-sensitive switches corresponding to a respective aspect of the vehicle, the control configured interpret inputs from each of the touch-sensitive switches and issue commands to the respective aspect of the vehicle, the plurality of touch-sensitive switches are arranged adjacent a plurality of indicators, and each of the plurality of touch-sensitive switches are rearward of each of the plurality of indicators.

DETAILED DESCRIPTION

Figure 1:
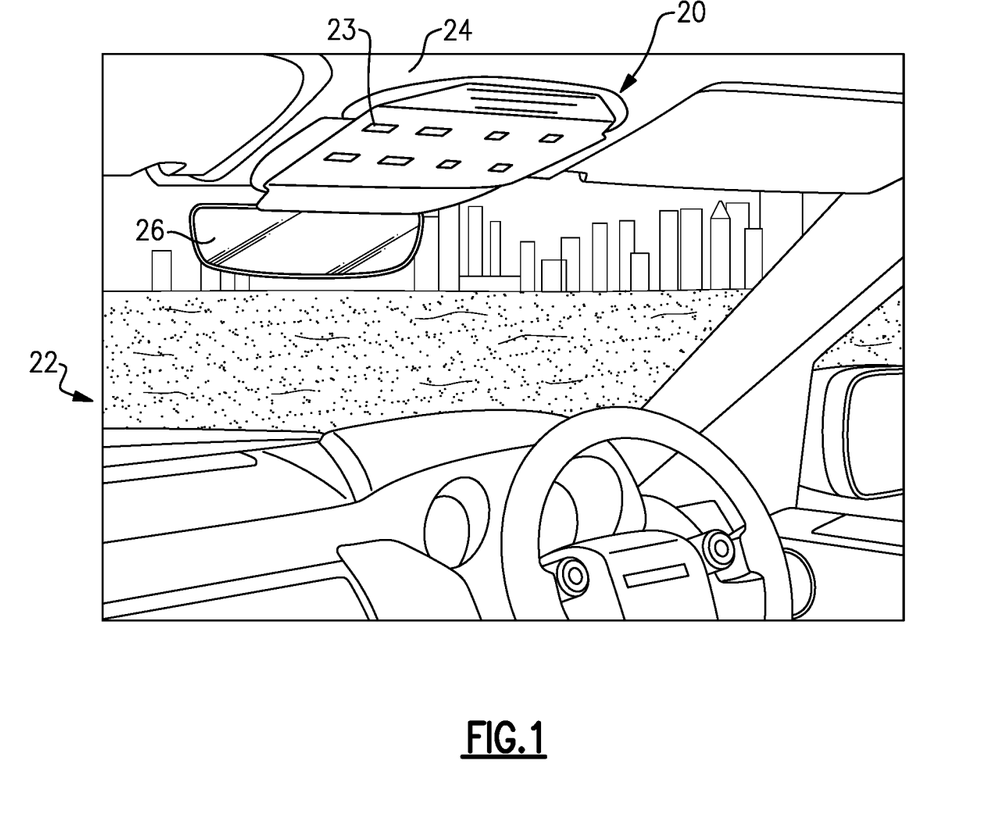
FIG. 1 illustrates an example console assembly in a passenger motor vehicle.

FIG. 1 illustrates an example console assembly 20 for a passenger motor vehicle, and in particular illustrates the console assembly 20 in a vehicle interior cabin 22. The example console assembly 20 includes a user interface 23 and is an overhead console assembly located at the interior roof 24 of the vehicle cabin 22. Other console locations may be utilized. In some examples, the console assembly 20 is located in proximity to a mirror or display 26. In an example, at least part of the display 26 can be integrally formed with parts of the console assembly 20.

Figure 2:
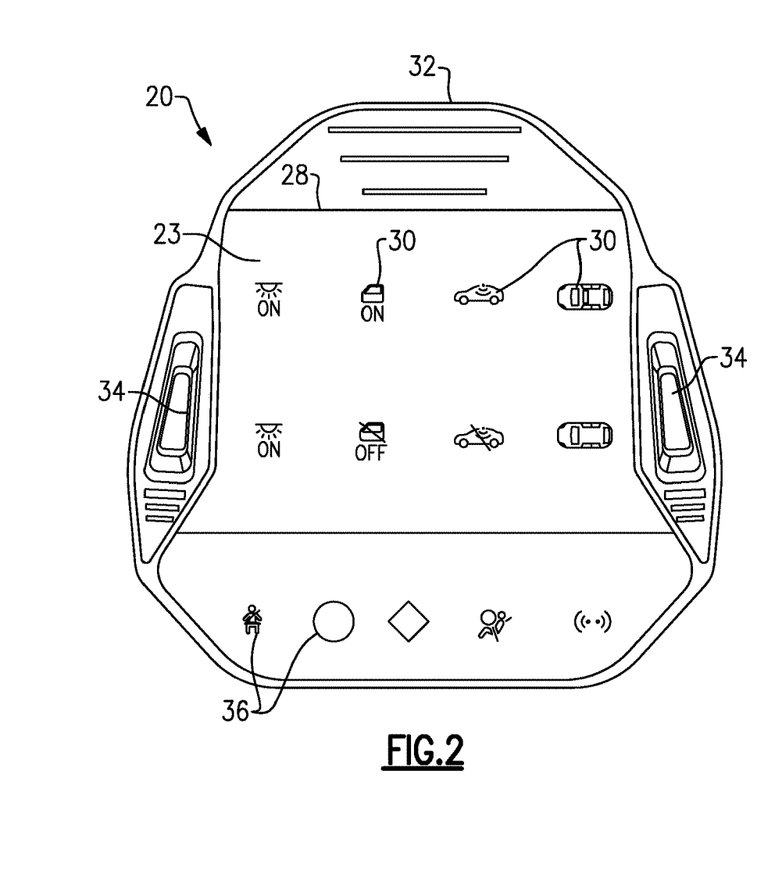
FIG. 2 illustrates the example console assembly of FIG. 1.

FIG. 2 illustrates the example console assembly 20 in more detail. The example user interface 23 is a touch-sensitive interface including a panel 28 having one or more touch-sensitive switches 30 configured to control various vehicle features. Other touch-sensitive configurations in which a user can give input or control through simple or multi-touch gestures are contemplated. In some examples, the switches 30 are Piezo touch switches. Each of the switches 30 may control one of the following aspects of a vehicle: sunroof and/or sunshade, rear lift gate, Wi-Fi, Bluetooth, window, window lock, door lock, camera inputs, on/off, trunk, and HVAC control. Alternatively or in addition to Piezo touch switches, the user interface 23 may include one or more of gesture control and tactile feedback.

A light guide 32 may be provided around the outer periphery of the panel. The example console assembly 20 may further include one or more lamps 34. The example lamps 34 are located at opposing sides of the group of switches 30, in this example. The panel 28 may include one or more indicators 36 configured to selectively indicate, such as through illumination for example, a vehicle condition. Some example vehicle conditions indicated by the example indicators 36 may include airbag conditions, seatbelt conditions, child sensor conditions, air quality conditions, and light sensor conditions. In the embodiment of FIG. 2, each of the plurality of touch-sensitive switches 30 are rearward of each of the plurality of indicators 36. The indicators 36 are on a surface of the console assembly 20 that is inclined relative to a surface of the console assembly 20 containing the group of switches 30.

Figure 3:
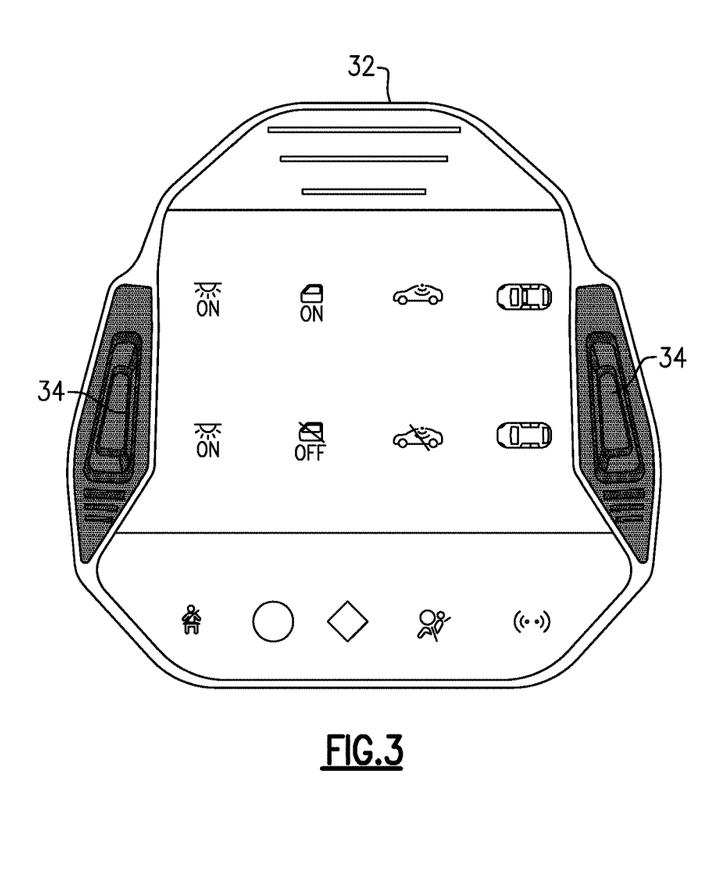
FIG. 3 illustrates the example console assembly of FIGS. 1 and 2 in an illuminated state.

FIG. 3 illustrates the example console assembly 20 with the light guide 32 and lamps 34 illuminated. In some examples, the lamps 34 are reading lamps. In some examples, one or both of the light guide 32 and lamps 34 may be illuminated to indicate a door ajar condition.

Figure 4:
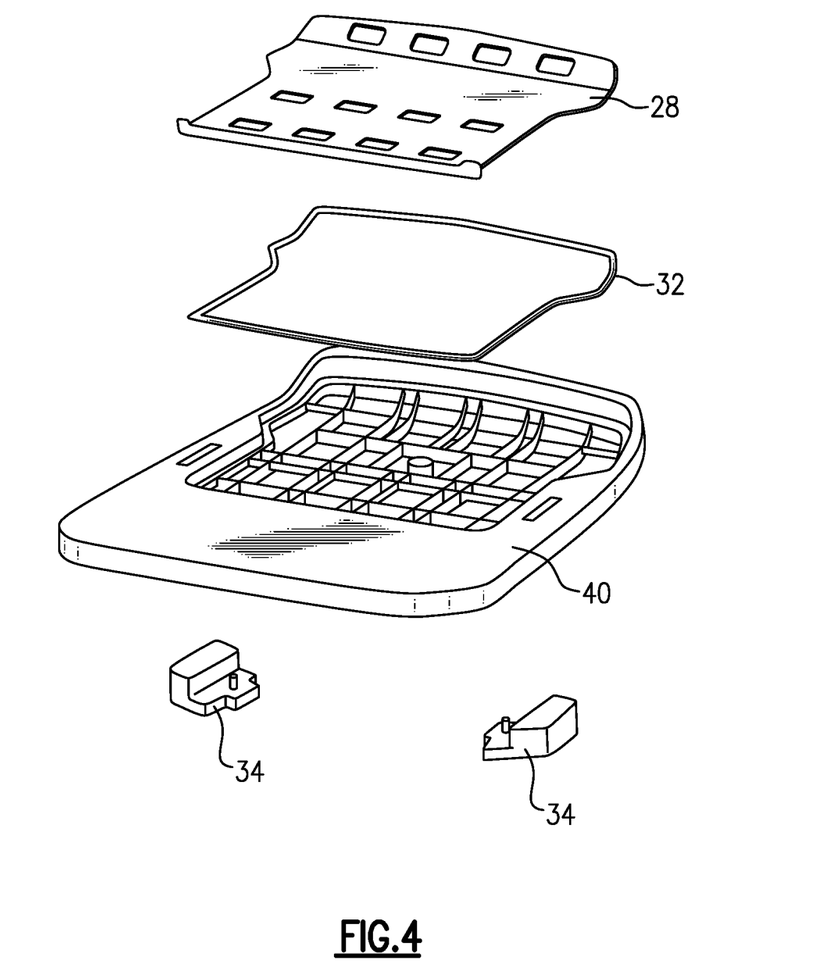
FIG. 4 illustrates an exploded view of an example console assembly.

FIG. 4 illustrates an exploded view of an example mounting configuration of the example assembly 20. A panel 28 and light guide 32 around the outer periphery of the panel 28 are received in a housing 40. The housing 40 also receives the lamps 34. Other mounting configurations may be utilized, including press-fit connections, detent/gap connections, etc.

Figure 5:
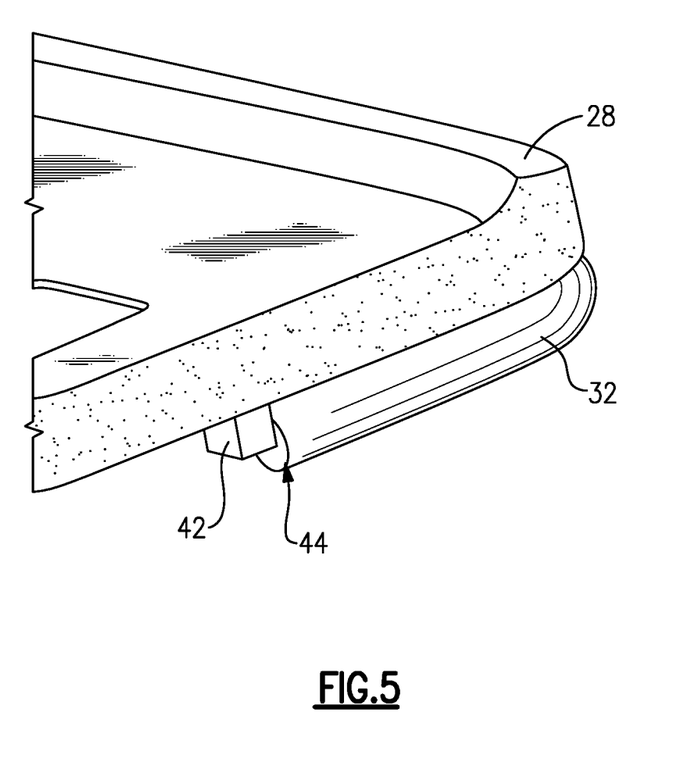
FIG. 5 illustrates a partial section of an example console assembly.

FIG. 5 illustrates a portion of the example console assembly 20. A light source 42, one example being a light emitting diode (LED), may be provided proximal to an end 44 of the light guide 32. In some examples, the light guide 32 may be a printed light guide. The panel 28 may be laser carved and paint sprayed in some examples.

Figure 6:
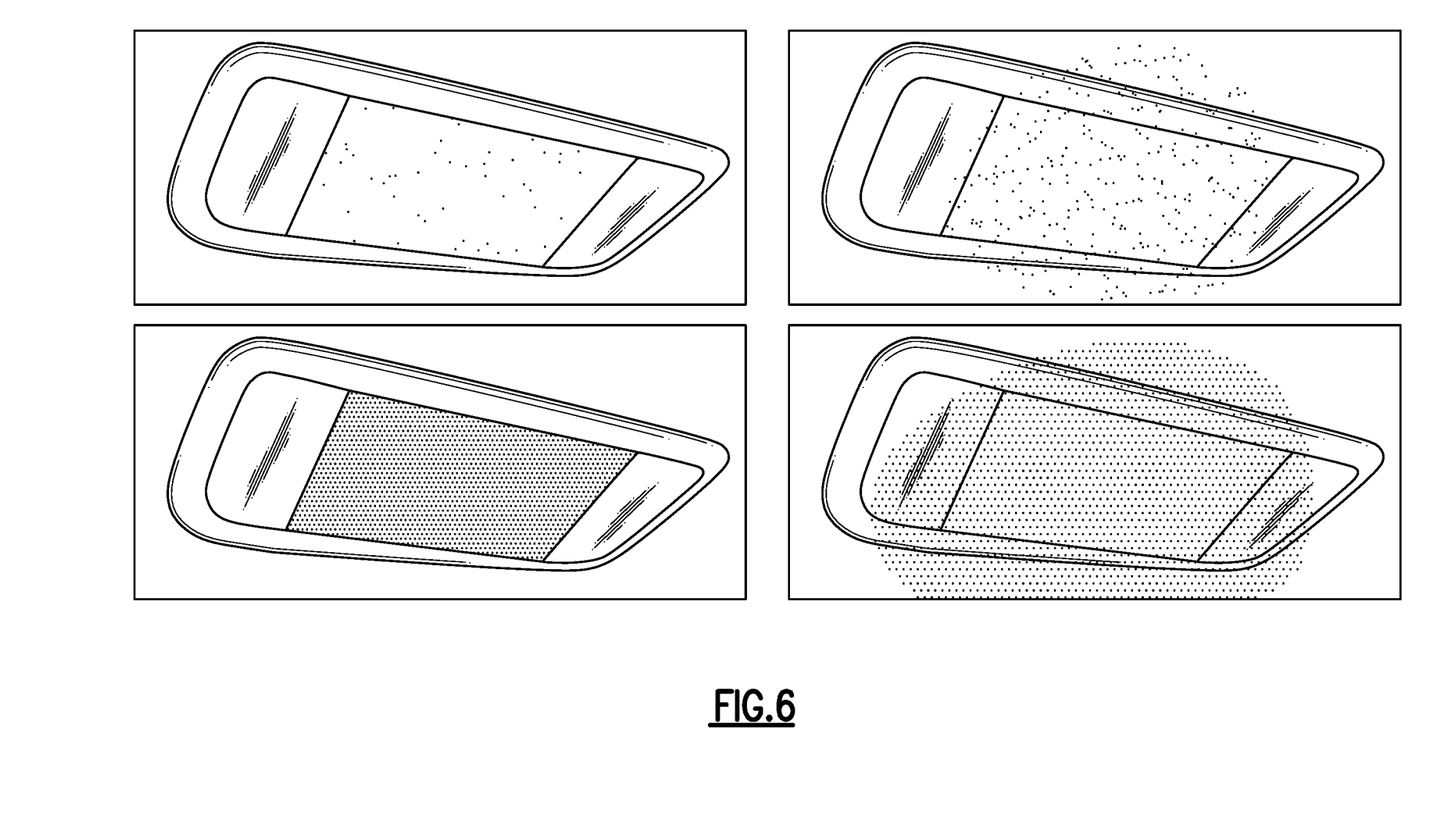
FIG. 6 schematically illustrates an example console assembly at various illumination settings.

FIG. 6 schematically illustrates the example console assembly 20 at various illumination settings.

Figure 7:
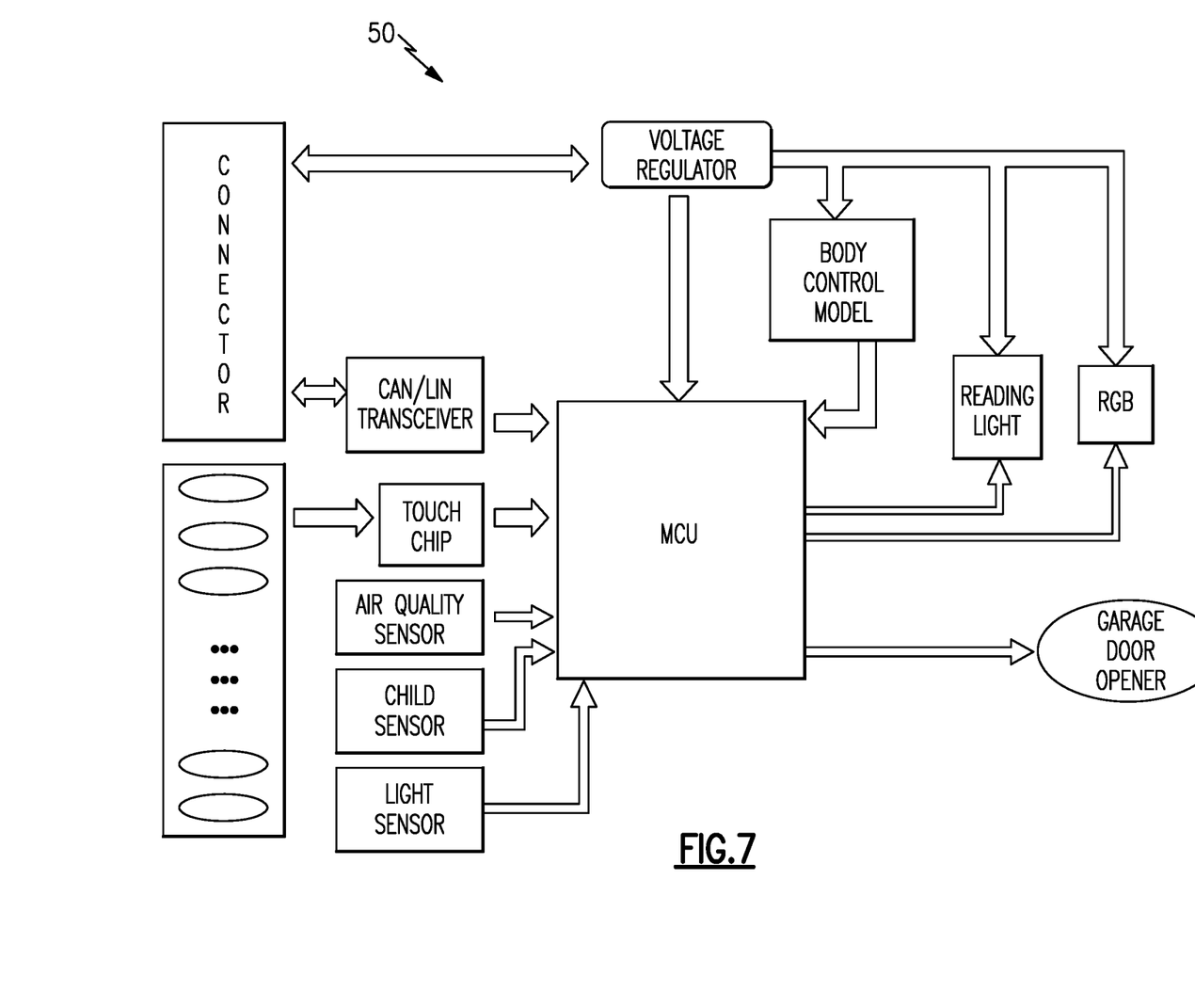
FIG. 7 schematically illustrates an example circuit.

FIG. 7 schematically illustrates an example circuit 50 of the console assembly 20. In some examples, with reference to FIGS. 1-6, the circuit 50 is provided integrally with the panel 28. In some examples, the circuit 50 is integral with the panel 28 through a flexible circuit board arrangement or other printed circuit board arrangement. In some examples, the circuit 50 may be provided separately from the panel 28, such as between the panel 28 and a housing 40. The circuit 50 is configured to receive one or more inputs from the touch-sensitive panel, specifically the switches 30, and issue commands to control one or more aspects of the vehicle (i.e., various mechanical and/or electrical assemblies/subassemblies of the vehicle).

Figure 8:
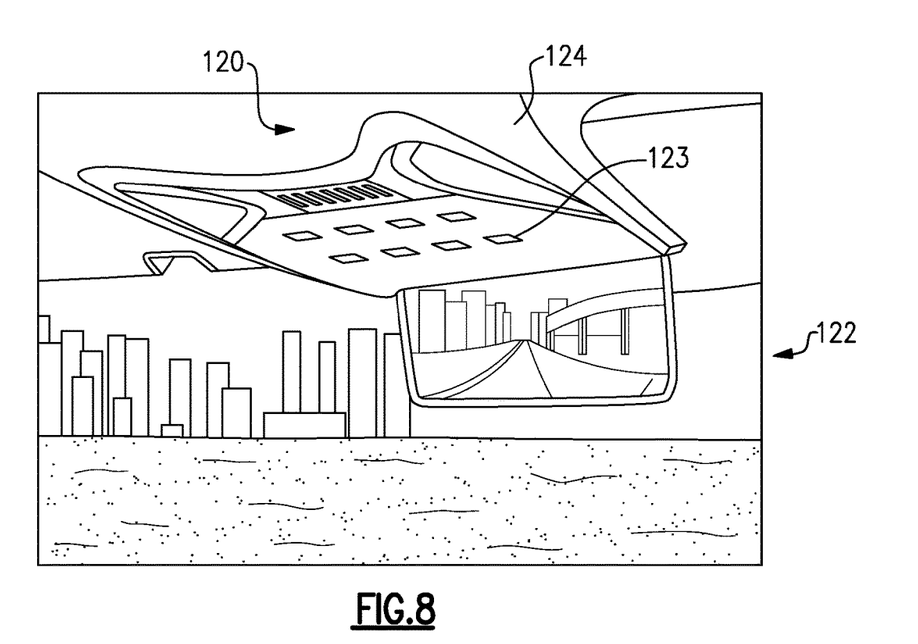
FIG. 8 illustrates another example console assembly in a vehicle.

FIG. 8 illustrates an example console assembly 120 in a vehicle interior cabin 122. The example console assembly 120 includes a user interface 123 and is an overhead console assembly located at the interior roof 124 of the vehicle cabin 122. It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

Figure 9:
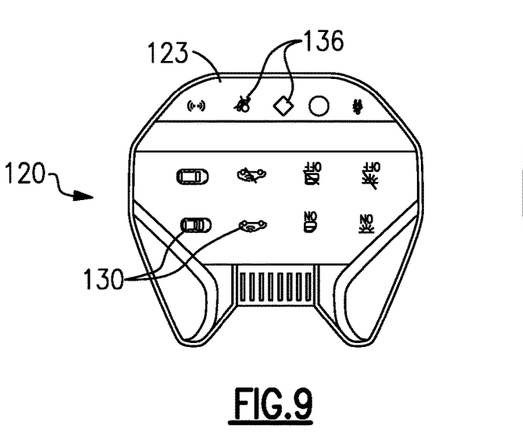
FIG. 9 illustrates the example console assembly shown in FIG. 8.

FIG. 9 illustrates the example console assembly 120 with user interface 123 having switches 130 and indicators 136.

Figure 10:
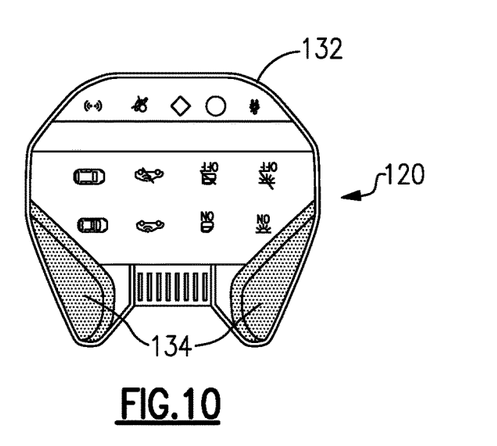
FIG. 10 illustrates the example console assembly of FIGS. 8 and 9 in an illuminated state.

FIG. 10 illustrates the example console assembly 120 with the light guide 132 and lamps 134 illuminated.

Figure 11:
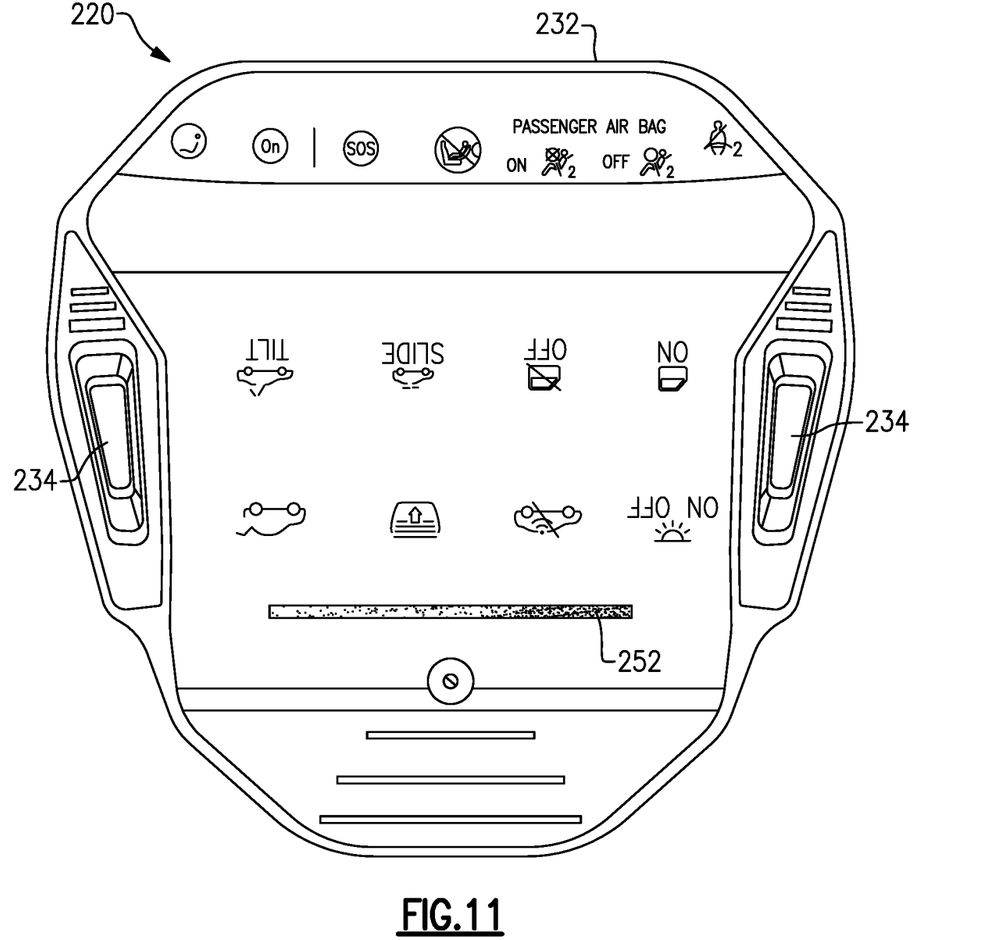
FIG. 11 illustrates another example console assembly.

FIG. 11 illustrates an example console assembly 220, include an RGB selector 252 configured to adjust the color of one or both of the light guide 232 and the lamps 234.

Figure 12:
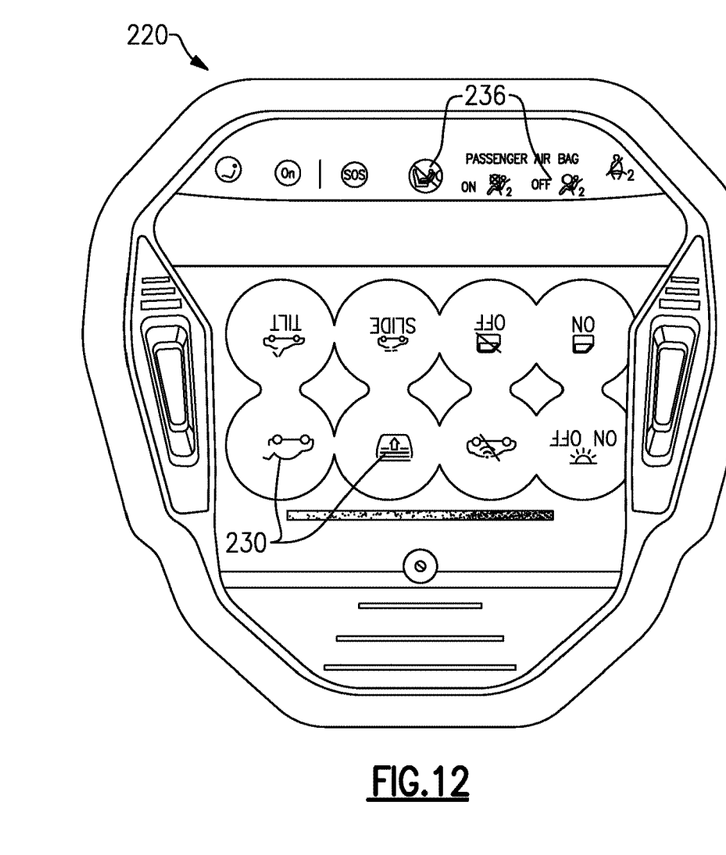
FIG. 12 illustrates the example console assembly of FIG. 11.

FIG. 12 illustrates the user interface of the console assembly 220, including switches 230 and indicators 236.

Figure 13:
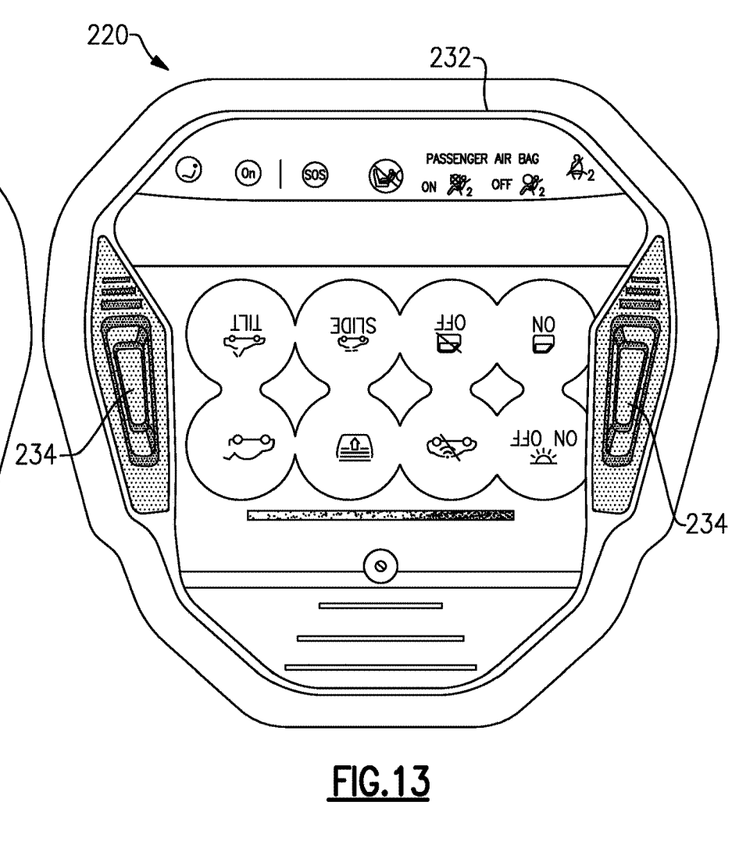
FIG. 13 illustrates the example console assembly of FIGS. 11 and 12 in an illuminated state.

FIG. 13 illustrates the example console assembly 220 with the light guide 232 and lamps 234 illuminated.

It should be understood that terms such as "outside," "forward," "rearward," "vertical," and "horizontal" are used above with reference to the normal, upright position of a car seat in a vehicle. These terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. A console assembly for a vehicle, comprising: a touch-sensitive panel providing a plurality of touch-sensitive switches, each of the touch corresponding to a respective aspect of the vehicle; and a circuit electrically connected to the plurality of touch-sensitive switches the circuit configured to interpret inputs from each of the touch-sensitive switches and issue commands to the respective aspect of the vehicle, wherein a plurality of touch-sensitive switches is arranged adjacent a plurality of indicators, each of the plurality of touch-sensitive switches is configured to selectively control one of a sunroof, sunshade, rear lift gate, Wi-Fi, Bluetooth, window, window lock, door lock, camera inputs, on/off, trunk, and an HVAC system, and each of the plurality of indicators is configured to selectively illuminate to indicate one of an airbag condition, seatbelt condition, child sensor condition, air quality condition, and a light sensor condition;

further comprising a light guide arranged at an outer periphery of the panel; and
a lamp.

2. The console assembly as recited in claim 1, wherein the circuit is integral with the panel.

3. The console assembly as recited in claim 1, wherein the circuit includes a flexible circuit board.

4. The console assembly as recited in claim 1, wherein the console assembly is an overhead console assembly.

5. The console assembly as recited in claim 1, further comprising: a housing that receives the panel.

6. The console assembly as recited in claim 1, further comprising a selector configured to adjust a color of light emitted from one or both of the light guide and lamp.

7. The console assembly as recited in claim 1, wherein the lamp is a first lamp and wherein the console assembly further comprises a second lamp.

8. The console assembly as recited in claim 1, further comprising a light source adjacent an end of the light guide and configured to direct light along the light guide.

9. The console assembly as recited in claim 8, wherein the light source is an LED.

10. A console assembly for a vehicle, comprising:
a touch-sensitive panel providing at least one touch-sensitive switch; and
a circuit electrically connected to the at least one switch, the circuit configured to receive one or more inputs from the touch-sensitive panel and issue commands to control one or more aspects of the vehicle;
a light guide arranged at an outer periphery of the panel;
a lamp; and
a second lamp, wherein the circuit is configured to command the first lamp, second lamp, and light guide to illuminate to indicate a door ajar condition.

11. The console assembly as recited in claim 10, wherein the at least one touch-sensitive switch includes a plurality of touch-sensitive switches, and each of the plurality of touch-sensitive switches is configured to selectively control one of a sunroof, sunshade, rear lift gate, Wi-Fi, Bluetooth, window, window lock, door lock, camera inputs, on/off, trunk, and an HVAC system.

12. A console for a vehicle, comprising:
a touch-sensitive panel providing a plurality of touch-sensitive switches, each of the touch-sensitive switches corresponding to a respective aspect of the vehicle; and
a circuit electrically connected to the plurality of touch-sensitive switches, the circuit configured interpret inputs from each of the touch-sensitive switches and issue commands to the respective aspect of the vehicle, wherein each of the plurality of touch-sensitive switches is rearward of plurality of indicators,
further comprising a light guide arranged at an outer periphery of the panel; and
a lamp.

13. The console assembly as recited in claim 12, wherein the plurality of touch-sensitive switches is rearward of a plurality of indicators, and each of the plurality of indicators is configured to selectively illuminate to indicate one of an airbag condition, seatbelt condition, child sensor condition, air quality condition, and a light sensor condition.

14. The console assembly as recited in claim 12, further comprising a second lamp opposite the plurality of touch-sensitive switches from the lamp, and wherein each of the plurality of indicators is configured to selectively illuminate to indicate one of an airbag condition, seatbelt condition, child sensor condition, air quality condition, and a light sensor condition.

15. A vehicle, comprising:
an interior roof;
an overhead console assembly located adjacent the interior roof, the console assembly including:
a touch-sensitive panel providing a plurality of touch-sensitive switches, each of the touch-sensitive switches corresponding to a respective aspect of the vehicle; and
a circuit electrically connected to the plurality of touch-sensitive switches, the circuit configured to interpret inputs from each of the touch-sensitive switches and issue commands to the respective aspect of the vehicle, wherein the plurality of touch-sensitive switches is arranged rearward of a plurality of indicators.

16. The vehicle as recited in claim 15, wherein the circuit is integral with the panel.

17. The vehicle as recited in claim 15, wherein the circuit includes a flexible circuit board.

18. The vehicle as recited in claim 15, further comprising:
a light guide arranged at an outer periphery of the panel;
a light source adjacent an end of the light guide and configured to direct light along the light guide;
a lamp; and
a selector configured to adjust a color of light emitted from one or both of the light guide and lamp.

* * * * *